Dec. 3, 1963
I. P. KARLIN
3,112,938
INTEGRAL CABLE CLAMP CONSTRUCTION FOR
ELECTRICAL CONNECTION BOX
Filed July 15, 1959
2 Sheets-Sheet 2
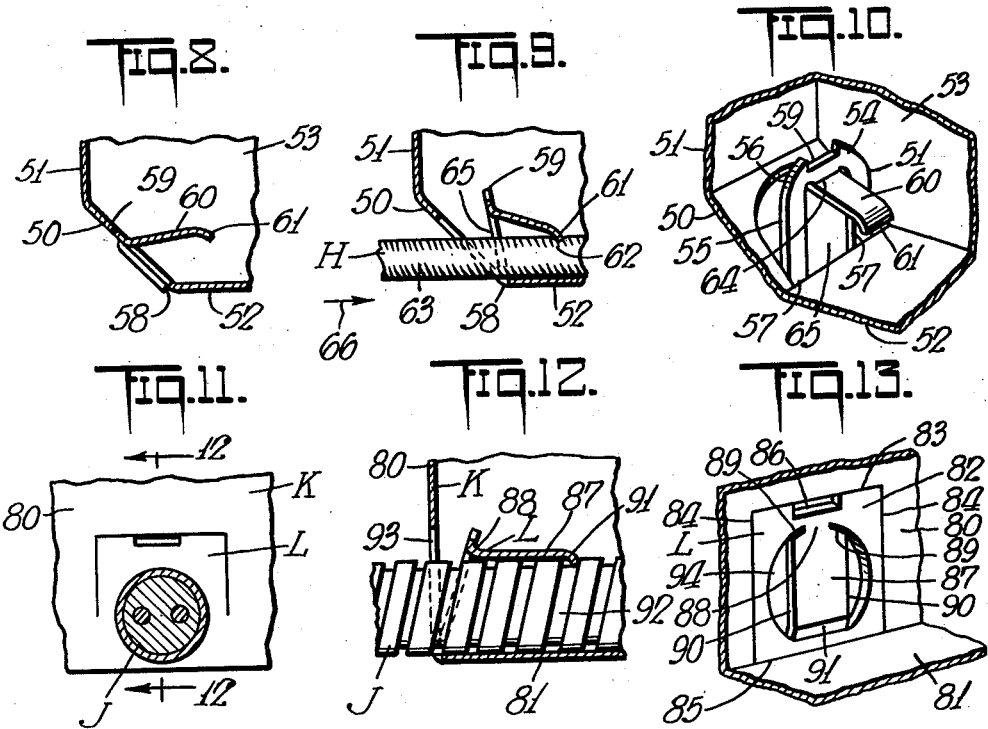
INVENTOR
*Irving P. Karlin*
BY
ATTORNEY

United States Patent Office
3,112,938
Patented Dec. 3, 1963

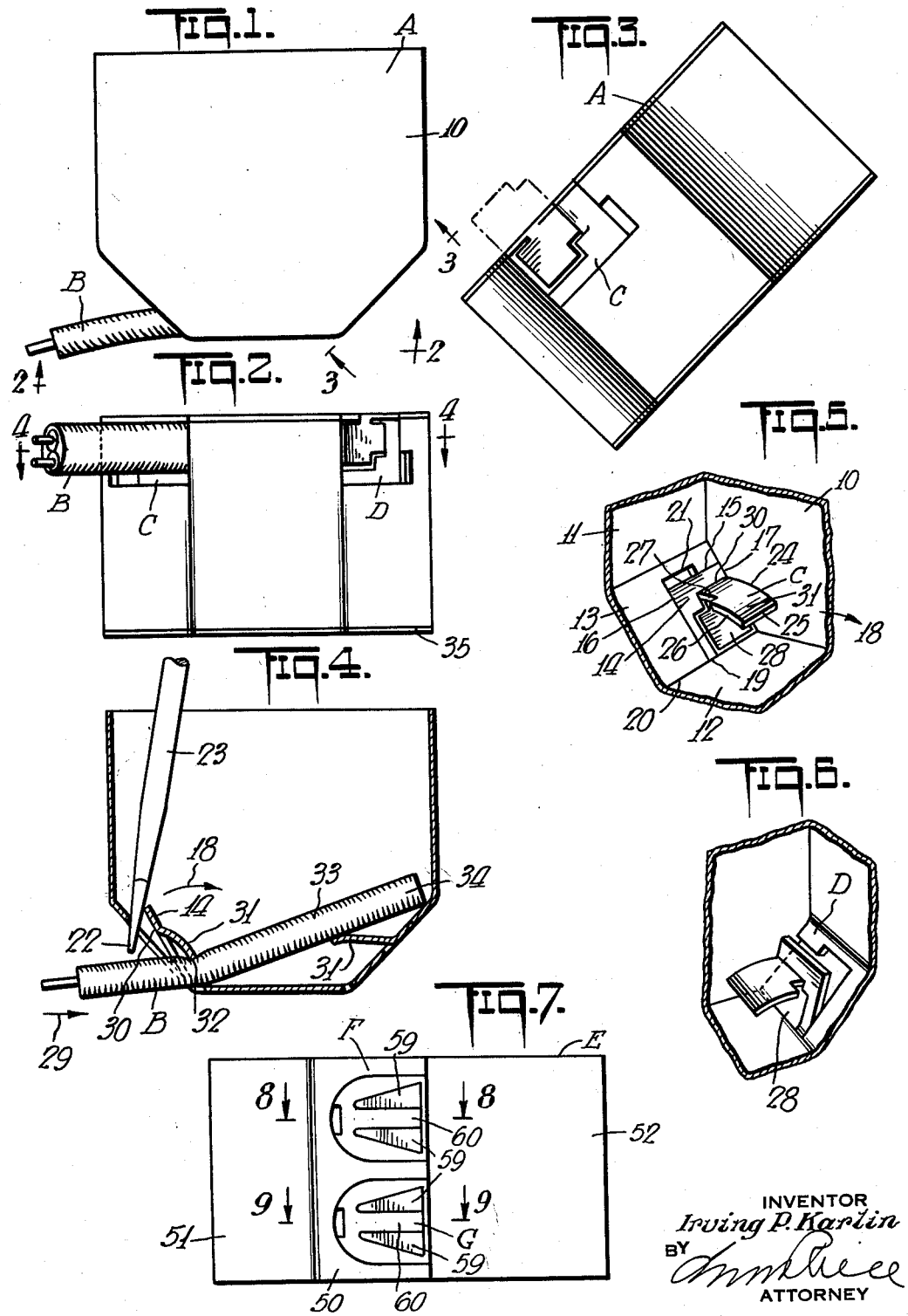

3,112,938
INTEGRAL CABLE CLAMP CONSTRUCTION FOR ELECTRICAL CONNECTION BOX
Irving P. Karlin, Great Neck, N.Y. (% Knight Electrical Products Co., 168 Van Brunt St., Brooklyn, N.Y.)
Filed July 15, 1959, Ser. No. 827,319
1 Claim. (Cl. 285—128)

The present invention relates to a cable clamp arrangement, and it particularly relates to a cable clamp arrangement for use in electrical connection boxes.

In electrical connection boxes there has been considerable difficulty in introducing the cables into the box and to clamp them in the box after introduction. It has been customary to provide separate nuts, screws and bolts and special clamping elements within the relatively limited space of the box, and these clamping arrangements require the use of tools which cannot be readily inserted or manipulated within the box and which also will not firmly hold the cable.

Moreover, many of these combinations of electrical connection box and cable clamp greatly increase the cost of the box and limit its capacity for making the necessary electrical connections, and also interfere with the outlets.

It is among the objects of the present invention to provide an integral electric connection box clamp which will be readily adaptable to either metal covered or plastic covered cable, and which will eliminate the need of inserting and manipulating tools within the box. Another object is to provide a novel cable clamp box construction in which the cable, when inserted, will automatically be locked into position in the box without the need of manipulating tools or inserting nuts, bolts or screws therein, and without the need of handling small clamping elements or clamping bolts.

Another object is to provide a novel integral box construction in which the cable may be substantially automatically locked within the box, regardless of whether the cable has a plastic soft cover or a metal armored cover, with assurance that only a minimum amount of space will be taken up inside of the connection box by the cable clamp, and with further assurance that the rest of the knock outs or mountings or connections provided for may be used without interference.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to provide partial knock outs or partial cut out members in the sides or bottom of the box, which will permit being bent out of the way and which also will permit insertion of the electrical cable. These partial cut outs or knock outs will desirably be provided with outstanding tongues which may be inserted into the edges or surface of the inserted cable so as to firmly lock it in position and prevent its withdrawal.

Desirably, the partial knock out has a recess, which recess is formed by a widely projecting tongue, the edge of which is so turned downwardly and inwardly as to lock in the ridges of a metal armored cable or to engage and fasten itself in the soft surface of a plastic or cloth covered cable.

The partial cut outs which form the cable clamps are desirably formed integrally with the sheet metal plate which is stamped and formed into the actual box walls and bottom. This may all be done as part of the stamping and forming operation, and it will not be necessary to add separate nuts, bolts, screws or clamping plates.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

FIG. 1 is a side elevational view of one form of electrical connection box, with a cable shown inserted thereon.

FIG. 2 is a side elevational view taken from the line 2—2 of FIG. 1.

FIG. 3 is a side elevational view taken from the line 3—3 of FIG. 1.

FIG. 4 is a transverse sectional view upon the line 4—4 of FIG. 2.

FIG. 5 is a fragmentary inside perspective view showing the cable clamp stamp out of FIG. 1.

FIG. 6 is a fragmentary inside perspective view showing the opposite corner arrangement not shown in FIG. 5, which may also provide for a cable entrance or exit.

FIG. 7 is an alternative plan view of the bottom of the box, showing a different form of integral cable clamp.

FIG. 8 is a fragmentary transverse sectional view taken upon the line 8—8 of FIG. 7 with the locking tongue in elevated position to prevent insertion of a cable.

FIG. 9 is a fragmentary transverse sectional view upon the line 9—9 of FIG. 7 showing the cable inserted and locked in position.

FIG. 10 is a fragmentary inside corner perspective view of a metal box with the cable clamp in the position as shown in FIG. 9 with the cable removed so as to show the clamping arrangement.

FIG. 11 is an outside sectional view showing the insertion of a metal covered or armored cable inserted in a connection box.

FIG. 12 is a transverse sectional view upon the line 12—12 of FIG. 11.

FIG. 13 is a fragmentary inside perspective view showing the position of the cable clamping arrangement of FIGS. 11 and 12 before insertion of the armored cable.

Referring to FIGS. 1 to 6, the box A is shown as being provided with a flexible surface cable B, and it has the integral cable clamping arrangements C and D.

Referring particularly to FIG. 5, the box has the side wall 10, the end wall 11, and the bottom wall 12, together with the oblique connecting wall 13. The cable clamp C is inserted in the oblique connecting wall 13 and it is formed by the bendable partial stamp out 14, which is partially cut along the lines 15, 16 and 17 so that it may be moved inwardly in the direction indicated by 18 without losing its connection at 19 along the bent line 20 between the walls 12 and 13.

The recess or slot is provided at 21 to permit insertion of the thin edge 22 of a screw driver 23, which will permit the metal 14 to be bent inwardly as indicated by the arrow 18. The main body of the tongue is again cut out along the edges 24, 25 and 26, as well as the notched corner 27, to form a locking tongue, and also to form the opening 28 into which the cable B may be inserted as indicated by the directional arrow 29.

The connection 30 between the top of the locking tongue C and the body of the metal portion 14 will not be cut so that it will be a permanent field connection.

It will be noted therefore that firstly the metal portion 14 may be bent inwardly on the bent line 19, while the metal portion 31 may be bent inwardly upon the bent line 30. The metal portion 31, when bent in the direction 18, will form the opening or window 28 for insertion of the cable B, and since it is turned downwardly and inwardly at the bottom edge 25, it will grip into and prevent withdrawal of the cable B after it has once been inserted.

It will be noted that both integral cable clamps C and D, as shown in FIGS. 5 and 6, are of the same construction and will reliably grip the inserted cable B when once inserted in the box without the need of separate nuts, screws, bolts, or clamping plates.

If desired, the opposite tongue, or metal plate 31, may serve as a holder, as indicated at 33 in FIG. 7 for the end 34 of the cable B.

Or, on the other hand, the cable may be passed entirely through the box by the opposite windows 28, as shown in FIGS. 5 and 6.

Or, on the other hand, two opposite cables may be introduced through the integral cable clamps C and D. It will be noted by reference to FIGS. 1 and 2 that one side 10 of the box A may be formed integrally, while the other side 35 may take the form of a separable covered plate.

In the embodiment shown in FIGS. 7, 8, 9, and 10, the integral cable clamps are formed on the wall 50 of the box E, two of these integral clamps being shown at F and G. The wall 50 will be an oblique wall between the vertical wall 51 and the bottom wall 52. These walls may be stamped out integrally with the side wall 53 of the box.

As shown best in FIG. 10, the ear or plate 54 is cut out along the side edges 55 and at the top edge 56 but has an integral joint at 57 along the corner 58 of the box.

A recess 59 is provided for insertion of a screw driver, which will enable the metal 54 to be pressed outwardly into the position shown in FIG. 10. The side portions 59 may be stamped out so that there will only be a central tongue 60, which has a down-turned end portion 61.

This down-turned end portion 61 will grip at 62 into the soft surface 63 of the cable H. The tongue 60 will have an integral hinge at 64 to the upper portion of the metal of the turned-out portion 54. This construction may be actuated by forcing a screw driver, such as 23 shown in FIG. 4, into the slot 59 and forcing out the metal 54, as shown in FIGS. 9 and 10. The tongue 60, with removal of the side pieces 59, will form a window 65, into which the cable H may be inserted in the direction 66.

In the last embodiment shown in FIGS. 11, 12 and 13, an armored cable J is shown to be fitted into the box K having the integral locking member L.

This integral locking member is formed in the wall 80 adjacent to the bottom wall 81. The integral locking device L consists of a metal knock out or press out 82, partially cut along the lines 83 and 84, which has an integral bent line at 85. Within the plate 82 will be a slot 86 for a screw driver, as well as the tongue 87.

The tongue 87 will have an integral neck connection 88 and have stamp out edges 89, 90 and 91. The edge 91 will be turned outwardly, as shown best in FIG. 12, so as to engage in the ridges 92 of the armored cable J.

When the armored cable J is inserted in the window or opening 93 in the side 80 of the box K and through the window or opening 94 in the plate 82, it will be lodged or locked in position at the in-turned portion 91 of the locking tongue 87.

It is thus apparent that the applicant has provided in FIGS. 1 to 13 an integrally locking tongue arrangement in which flexibility is provided by a main swinging partial stamp out member 14 of FIG. 5, 54 of FIG. 10, and 82 of FIG. 13, which, together with the additional auxiliary locking tongue 31, FIG. 5, 60 of FIG. 10, and 87 of FIG. 13, lock the cable within the connection box A, E and K without the need of using separate locking screws, bolts, nuts, or other clamps.

Moreover, there will be a minimum consumption of space within the box itself, and the side walls of the box will be available for the standard electrical connections.

As many changes could be made in the above integral cable clamp construction for electrical connection box, and many widely different embodiments of this invention could be made without departure from the scope of the claim, it is intended that all matter contained in the above description shall be interpreted as illustrative and not in a limiting sense.

Having now particularly described and ascertained the nature of the invention, and in what manner the same is to be performed, what is claimed is:

An integral cable clamp for a metal wall electrical connection box having metal bottom, side and end walls and receiving a covered electrical cable extending thereinto, the walls receiving partial knockouts in the lower part of the box, said knockouts being hinged adjacent to and parallel to an edge joining together two of the walls and having three sides which are separable from the wall in which they are knockouts and said knockouts having secondary knockouts formed in the first knockouts having hinge portions parallel to the edge but removed from the edge adjacent the free end of the first knockout, said hinges being provided and arranged so as to permit the first partial knockout to move inwardly upwardly and the secondary partial knockout to move inwardly downwardly so as to clamp a cable against an interior wall of the box.

References Cited in the file of this patent
UNITED STATES PATENTS

| | | |
|---|---|---|
| 1,841,212 | Sachs | Jan. 12, 1932 |
| 1,902,294 | Rubovits | Mar. 21, 1933 |
| 2,466,504 | Stoyer | Apr. 5, 1949 |
| 2,814,510 | Clark | Nov. 26, 1957 |
| 2,850,300 | Jennings | Sept. 2, 1958 |